(12) United States Patent
Zhou et al.

(10) Patent No.: US 10,271,083 B2
(45) Date of Patent: Apr. 23, 2019

(54) PRE-ROLL ADVERTISEMENT PLAYING METHOD, TERMINAL, AND VIDEO SERVER

(71) Applicant: TENCENT TECHNOLOGY (SHENZHEN) COMPANY LIMITED, Shenzhen (CN)

(72) Inventors: Bin Zhou, Shenzhen (CN); Gang Xu, Shenzhen (CN); Lieqiong Jiang, Shenzhen (CN); Tingzan Li, Shenzhen (CN); Wenqing Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 15 days.

(21) Appl. No.: 15/645,229

(22) Filed: Jul. 10, 2017

(65) Prior Publication Data

US 2017/0311024 A1 Oct. 26, 2017

Related U.S. Application Data

(63) Continuation of application No. PCT/CN2016/079187, filed on Aug. 13, 2016.

(30) Foreign Application Priority Data

Apr. 28, 2015 (CN) .......................... 2015 1 0209604

(51) Int. Cl.
*H04N 21/262* (2011.01)
*H04N 21/81* (2011.01)
(Continued)

(52) U.S. Cl.
CPC ... *H04N 21/26258* (2013.01); *H04N 21/4325* (2013.01); *H04N 21/4332* (2013.01);
(Continued)

(58) Field of Classification Search
CPC ......... H04N 21/26258; H04N 21/4325; H04N 21/4332; H04N 21/4334; H04N 21/43637;
(Continued)

(56) References Cited

U.S. PATENT DOCUMENTS

2006/0271425 A1\* 11/2006 Goodman .............. G06Q 30/02
705/14.58
2007/0294773 A1 12/2007 Hydrie et al.
(Continued)

FOREIGN PATENT DOCUMENTS

CN 101079719 A 11/2007
CN 101600089 A 12/2009
(Continued)

OTHER PUBLICATIONS

The World Intellectual Property Organization (WIPO) International Search Report for PCT/CN2016/079187 dated Jul. 12, 2016.
(Continued)

*Primary Examiner* — Rong Le
(74) *Attorney, Agent, or Firm* — Anova Law Group, PLLC

(57) ABSTRACT

The present disclosure discloses a pre-roll advertisement playing method, a terminal, and a video server, and relates to the field of multimedia technologies. The method includes: after detecting a play operation of an offline video, determining a current network connection status of a terminal; when the terminal is in a first connection state, determining, among multiple pre-roll advertisements obtained by the terminal, a specified pre-roll advertisement corresponding to the offline video; and playing the specified pre-roll advertisement in a process of playing the offline video. When playing an offline video in a non-WiFi connection state, the terminal may additionally play a pre-roll adver-
(Continued)

tisement. Therefore, an audience range of the pre-roll advertisement is expanded, and an application range is relatively wide.

14 Claims, 6 Drawing Sheets

(51) Int. Cl.
    *H04N 21/433* (2011.01)
    *H04N 21/442* (2011.01)
    *H04N 21/432* (2011.01)
    *H04N 21/4363* (2011.01)
    *H04N 21/61* (2011.01)
    *H04N 21/6547* (2011.01)

(52) U.S. Cl.
    CPC ... *H04N 21/4334* (2013.01); *H04N 21/43637* (2013.01); *H04N 21/442* (2013.01); *H04N 21/44209* (2013.01); *H04N 21/44227* (2013.01); *H04N 21/6131* (2013.01); *H04N 21/6547* (2013.01); *H04N 21/812* (2013.01)

(58) Field of Classification Search
    CPC ........... H04N 21/442; H04N 21/44209; H04N 21/44227; H04N 21/6131; H04N 21/6547; H04N 21/812
    See application file for complete search history.

(56) References Cited

U.S. PATENT DOCUMENTS

| | | | | |
|---|---|---|---|---|
| 2008/0276269 | A1* | 11/2008 | Miller | G06Q 30/02 725/34 |
| 2010/0287580 | A1* | 11/2010 | Harding | G06Q 30/0247 725/14 |
| 2011/0087603 | A1* | 4/2011 | Garcia | G06F 17/30905 705/55 |
| 2013/0298026 | A1 | 11/2013 | Fitzpatrick et al. | |

FOREIGN PATENT DOCUMENTS

| | | |
|---|---|---|
| CN | 101882409 A | 11/2010 |
| CN | 102597997 A | 7/2012 |
| CN | 103813213 A | 5/2014 |
| CN | 104883610 A | 9/2015 |
| JP | 2008546075 A | 12/2008 |
| JP | 2010526497 A | 7/2010 |
| JP | 2012526321 A | 10/2012 |
| JP | 2013507721 A | 3/2013 |

OTHER PUBLICATIONS

The State Intellectual Property Office of the People's Republic of China (SIPO) Office Action 1 for 201510209604.1 dated Jul. 3, 2017.
The Japan Patent Office (JPO) Office Action for Application No. 2017-556657 dated Jul. 13, 2018 13 Pages (including translation).

* cited by examiner

US 10,271,083 B2

PRE-ROLL ADVERTISEMENT PLAYING METHOD, TERMINAL, AND VIDEO SERVER

RELATED APPLICATION

This application is a continuation of PCT Application No. PCT/CN2016/079187, filed on Apr. 13, 2016, which claims priority to Chinese Patent Application No. 201510209604.1, filed with the Chinese Patent Office on Apr. 28, 2015 and entitled "PRE-ROLL ADVERTISEMENT PLAYING METHOD AND APPARATUS," which are incorporated herein by reference in entirety.

FIELD OF THE TECHNOLOGY

The present disclosure relates to the field of multimedia technologies, and in particular, to a pre-roll advertisement playing method, a terminal, and a video server.

BACKGROUND OF THE DISCLOSURE

With rapid development of network technologies, video sharing websites are very popular due to features that Internet users can smoothly post videos online, browse videos, share or watch videos, download videos online, and the like on video sharing websites. Video sharing websites have a large and wide audience. Therefore, advertisements are usually pushed currently by using video sharing websites, to promote related products. When pushing advertisements, video sharing websites generally use an advertisement form of a pre-roll advertisement. The pre-roll advertisement refers to a video advertisement played before content of a video is formally played or when the content is played. The pre-roll advertisement is used for conveying brand or product information to a user.

In existing technology, when a user terminal is in a WiFi (Wireless Fidelity, wireless fidelity) state, if a user watches an online video or an offline video by using a video sharing website, a pre-roll advertisement is played in a process of playing the online video or the offline video. The offline video refers to a video locally downloaded to the terminal in a WiFi state or a cellular network connection state, and the offline video may be locally stored in the terminal for a long term.

However, playing a pre-roll advertisement often relies on a WiFi environment. Therefore, the audience and the application of the pre-roll advertisement are limited.

SUMMARY

To resolve the foregoing technical problem, embodiments of the present invention provide a pre-roll advertisement playing method, a terminal, and a video server. The technical solutions are as follows:

According to a first aspect, a method for playing pre-roll advertisement is provided. The method is applied to a terminal and includes detecting a play operation of an offline video; determining a current network connection status of the terminal; when the terminal is in a first connection state, determining, among multiple pre-roll advertisements obtained by the terminal, a specified pre-roll advertisement corresponding to the offline video; and playing the specified pre-roll advertisement in a process of playing the offline video.

According to a second aspect, a method for playing pre-roll advertisement is provided. The method is applied to a video server and includes obtaining a list of pre-roll advertisements that can be played when a terminal is in a first connection state; screening pre-roll advertisements in the list of pre-roll advertisements, to obtain a specified video index; and returning the specified video index to the terminal, so that the terminal determines, according to the specified video index and among multiple pre-roll advertisements obtained by the terminal, a specified pre-roll advertisement corresponding to a to-be-played offline video, and plays a specified pre-roll advertisement corresponding to the specified video index in the first connection state.

According to a third aspect, a pre-roll advertisement playing apparatus is provided. The apparatus includes a connection state determining module, configured to: after detecting a play operation of an offline video, determine a current network connection status of the terminal; a pre-roll advertisement determining module, configured to: when the terminal is in a first connection state, determine, among multiple pre-roll advertisements obtained by the terminal, a specified pre-roll advertisement corresponding to the offline video; and a pre-roll advertisement play module, configured to play the specified pre-roll advertisement in a process of playing the offline video.

According to a fourth aspect, a pre-roll advertisement playing apparatus is provided, applied to a video server and includes: a video list obtaining module, configured to obtain a list of pre-roll advertisements that can be played when a terminal is in a first connection state; a pre-roll advertisement screening module, configured to: screen pre-roll advertisements in the list of pre-roll advertisements, to obtain a specified video index; and a video index sending module, configured to return the specified video index to the terminal, so that the terminal determines, according to the specified video index and among multiple pre-roll advertisements obtained by the terminal, a specified pre-roll advertisement corresponding to a to-be-played offline video, and plays a specified pre-roll advertisement corresponding to the specified video index in the first connection state.

According to a fifth aspect, a terminal is provided, the terminal including a processor and a memory, the memory storing program instructions, and the processor executing the program instructions stored in the memory to complete the following operations: detecting a play operation of an offline video; determining a current network connection status of the terminal; when the terminal is in a first connection state, determining, among multiple pre-roll advertisements obtained by the terminal, a specified pre-roll advertisement corresponding to the offline video; and playing the specified pre-roll advertisement in a process of playing the offline video.

According to a sixth aspect, a video server is provided, the server including a central processing unit and a memory, the memory storing computer program instructions, and the central processing unit executing the program code stored in the memory to perform the following operations: obtaining a list of pre-roll advertisements that can be played when a terminal is in a first connection state; screening pre-roll advertisements in the list of pre-roll advertisements, to obtain a specified video index; and returning the specified video index to the terminal, so that the terminal determines, according to the specified video index and among multiple pre-roll advertisements obtained by the terminal, a specified pre-roll advertisement corresponding to a to-be-played offline video, and plays a specified pre-roll advertisement corresponding to the specified video index in the first connection state.

In embodiments consistent with the present disclosure, after detecting a play operation of an offline video, a terminal determines a current network connection status of the terminal. Even if it is determined that the terminal is currently in a non-WiFi connection state such as a network-unconnected state or a cellular network connection state, the terminal may select a pre-roll advertisement matching the offline video and play the pre-roll advertisement in a process of playing the offline video, thereby achieving an objective of additionally playing a pre-roll advertisement when the offline video is played in the non-WiFi connection state, expanding an audience range of the pre-roll advertisement, and relatively widening an application range.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer, the following further describes embodiments of the present invention in detail with reference to the accompanying drawings.

Before the embodiments of the present invention are further described, terms involved in the embodiments of the present invention are first explained.

A first connection state refers to a non-Wireless Fidelity (WiFi) connection state. A second connection state refers to a WiFi connection state. The first connection state may be further classified into a third connection state and a network-unconnected state. The third connection state refers to a cellular network connection state such as a second generation mobile communications technology (2G), a third generation mobile communications technology (3G), or a fourth generation mobile communications technology (4G).

At present, more users download offline videos by using an offline download function, and watch the offline videos. However, at present there is no pre-roll advertisement when a terminal plays an offline video in the non-WiFi connection state. This undoubtedly wastes a large number of resources, and also decreases an audience range of the pre-roll advertisement. Based on the foregoing concern, in the present disclosure, a pre-roll advertisement is additionally played in a process of playing the offline video in the non-WiFi connection state, so as to expand the audience range of the pre-roll advertisement. In the embodiments of the present invention, the terminal downloads an offline video in the WiFi connection state. As the offline video is being downloaded, a pre-roll advertisement plug-in installed on the terminal further obtains material of multiple pre-roll advertisements from a video server. In addition, if the terminal watches a video online in a WiFi connection state, the pre-roll advertisement plug-in installed on the terminal also automatically locally buffers a corresponding pre-roll advertisement, so that the terminal stores multiple pre-roll advertisements. When the terminal is in the non-WiFi connection state and plays an offline video in the non-WiFi connection state, the terminal may play, based on the locally buffered pre-roll advertisement, a pre-roll advertisement before content of the offline video is formally played or in a process of playing the content.

Figure 1:
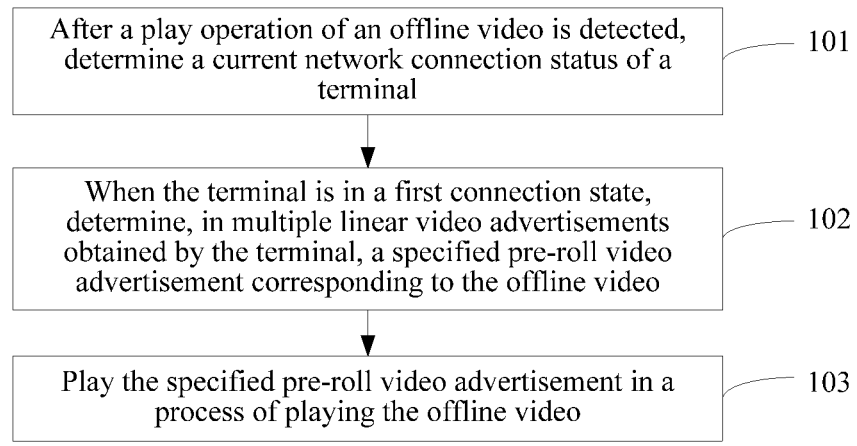
FIG. 1 is a flowchart of a pre-roll advertisement playing method according to an embodiment of the present invention.

FIG. 1 is a flowchart of a pre-roll advertisement playing method according to an embodiment of the present invention. An example in which a terminal executes the method is used. Referring to FIG. 1, a process of the method provided in this embodiment of the present invention includes:

101: After a play operation of an offline video is detected, determine a current network connection status of a terminal.

102: When the terminal is in a first connection state, determine, among multiple pre-roll advertisements obtained by the terminal, a specified pre-roll advertisement corresponding to the offline video.

103: Play the specified pre-roll advertisement in a process of playing the offline video.

According to the method provided in this embodiment of the present invention, after detecting a play operation of an offline video, a terminal determines a current network connection status of the terminal. Even if it is determined that the terminal is currently in a non-WiFi connection state such as a network-unconnected state or a cellular network connection state, the terminal may select a pre-roll advertisement matching the offline video and play the pre-roll advertisement in the process of playing the offline video, thereby achieving an objective of additionally playing a pre-roll advertisement when the offline video is played in the non-WiFi connection state, expanding an audience range of the pre-roll advertisement, and relatively widening an application range.

Optionally, before the determining a current network connection status of a terminal, the method further includes: in a second connection state, when detecting a video download operation, sending a pre-roll advertisement obtaining request to a video server; receiving at least one pre-roll advertisement index returned by the video server according to the pre-roll advertisement obtaining request; obtaining at least one pre-roll advertisement corresponding to the at least one pre-roll advertisement index, and storing the at least one pre-roll advertisement; and updating a list of locally stored pre-roll advertisements according to the at least one pre-roll advertisement index.

Optionally, the determining, among multiple pre-roll advertisements obtained by the terminal, a specified pre-roll advertisement corresponding to the offline video includes: when the terminal is in a third connection state, sending a pre-roll advertisement menu request to the video server, where the pre-roll advertisement menu request includes at least all locally buffered pre-roll advertisement indexes, so that the video server selects, from all the pre-roll advertisement indexes, a specified video index matching the offline video; receiving the specified video index returned by the video server; and determining, in all locally buffered pre-roll advertisements according to the specified video index, the specified pre-roll advertisement corresponding to the offline video.

Optionally, the determining, among multiple pre-roll advertisements obtained by the terminal, a specified pre-roll advertisement corresponding to the offline video includes: when the terminal is in a network-unconnected state, obtaining a specified video index returned by the video server, where the specified video index is selected by the video server from the at least one pre-roll advertisement index; and determining a pre-roll advertisement corresponding to the specified video index as the specified pre-roll advertisement corresponding to the offline video.

Optionally, the playing the specified pre-roll advertisement in a process of playing the offline video includes: obtaining a pre-roll advertisement play rule; and playing the specified pre-roll advertisement according to the pre-roll advertisement play rule in the process of playing the offline video.

Optionally, the obtaining a play rule of the specified pre-roll advertisement includes: when the terminal is in a network-unconnected state, obtaining a locally buffered pre-roll advertisement play rule; and when the terminal is in the third connection state, sending a play rule obtaining request to the video server, so that after receiving the play rule obtaining request, the video server delivers the play rule of the specified pre-roll advertisement to the terminal.

Optionally, after the playing the specified pre-roll advertisement, the method further includes: when the network connection status changes from the first connection state to the second connection state, updating a pre-roll advertisement index corresponding to the offline video; when detecting a new pre-roll advertisement index, downloading a pre-roll advertisement corresponding to the new pre-roll advertisement index; when the terminal is in the first connection state, after detecting the play operation of the offline video, updating the specified pre-roll advertisement corresponding to the offline video; and playing the updated specified pre-roll advertisement in the process of playing the offline video.

Optionally, the method further includes: when the network connection status is network-unconnected, after playing the specified pre-roll advertisement, storing advertisement viewing data corresponding to the specified pre-roll advertisement, where the advertisement viewing data includes at least a local play time of the pre-roll advertisement; and when the network connection status changes from network-unconnected to network-connected, reporting the advertisement viewing data to the video server and a third party server.

Optionally, the first connection state refers to a non-WiFi connection state.

Any combination of all the foregoing optional technical solutions may be used to form an optional embodiment of the present invention, and details are not described one by one herein.

Figure 2:
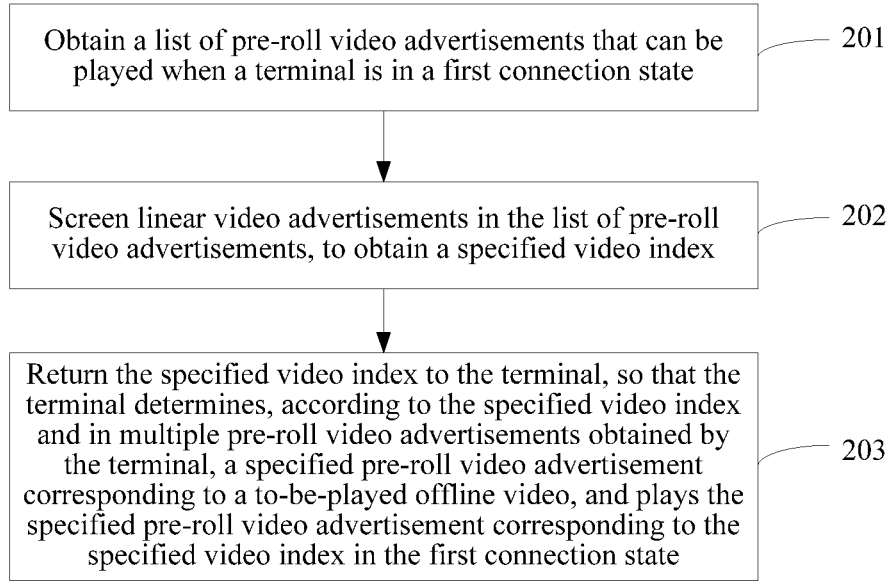
FIG. 2 is a flowchart of a pre-roll advertisement playing method according to an embodiment of the present invention.

FIG. 2 is a flowchart of a pre-roll advertisement playing method according to an embodiment of the present invention. An example in which a video server executes the method is used. Referring to FIG. 2, a process of the method provided in this embodiment of the present invention includes:

201: Obtain a list of pre-roll advertisements that can be played when a terminal is in a first connection state.

202: Screen pre-roll advertisements in the list of pre-roll advertisements, to obtain a specified video index.

203: Return the specified video index to the terminal, so that the terminal determines, according to the specified video index and among multiple pre-roll advertisements obtained by the terminal, a specified pre-roll advertisement corresponding to a to-be-played offline video, and plays a specified pre-roll advertisement corresponding to the specified video index in the first connection state.

According to the method provided in this embodiment of the present invention, after detecting a play operation of an offline video, a terminal determines a current network connection status of the terminal. Even if it is determined that the terminal is currently in a non-WiFi connection state such as a network-unconnected state or a cellular network connection state, a pre-roll advertisement matching the offline video may be determined by using a video server, and in the process of playing the offline video, a pre-roll advertisement matching the offline video is selected for playing, thereby achieving an objective of additionally playing a pre-roll advertisement when the offline video is played in the non-WiFi connection state, expanding an audience range of the pre-roll advertisement, and relatively widening an application range.

Optionally, the obtaining a list of pre-roll advertisements that can be played when a terminal is in a first connection state includes: when the terminal plays an offline video in a third connection state, receiving a pre-roll advertisement menu request sent by the terminal, where the pre-roll advertisement menu request includes at least all pre-roll advertisement indexes locally buffered by the terminal; and determining all the pre-roll advertisement indexes as the list of pre-roll advertisements that can be played when the terminal is in the first connection state.

Optionally, the obtaining a list of pre-roll advertisements that can be played when a terminal is in a first connection state includes: receiving a pre-roll advertisement obtaining request sent by the terminal, where the pre-roll advertisement obtaining request is sent after the terminal detects a download operation of the offline video, and the pre-roll advertisement obtaining request includes at least identification information of the offline video; and obtaining, according to the identification information of the offline video, the list of pre-roll advertisements that can be played when the terminal is in the first connection state.

Optionally, the method further includes: obtaining a specified pre-roll advertisement corresponding to the specified pre-roll advertisement index; and sending the specified pre-roll advertisement to the terminal.

Optionally, the screening pre-roll advertisements in the list of pre-roll advertisements, to obtain a specified video index includes: filtering the pre-roll advertisements in the list of pre-roll advertisements, to obtain a first list of pre-roll advertisements; screening pre-roll advertisements in the first list of pre-roll advertisements according to a video targeting condition, to obtain a second list of pre-roll advertisements; and selecting, from the second list of pre-roll advertisements, a pre-roll advertisement satisfying a menu condition, to obtain the specified video index.

Any combination of all the foregoing optional technical solutions may be used to form an optional embodiment of the present invention, and details are not described one by one herein.

Figure 3A:
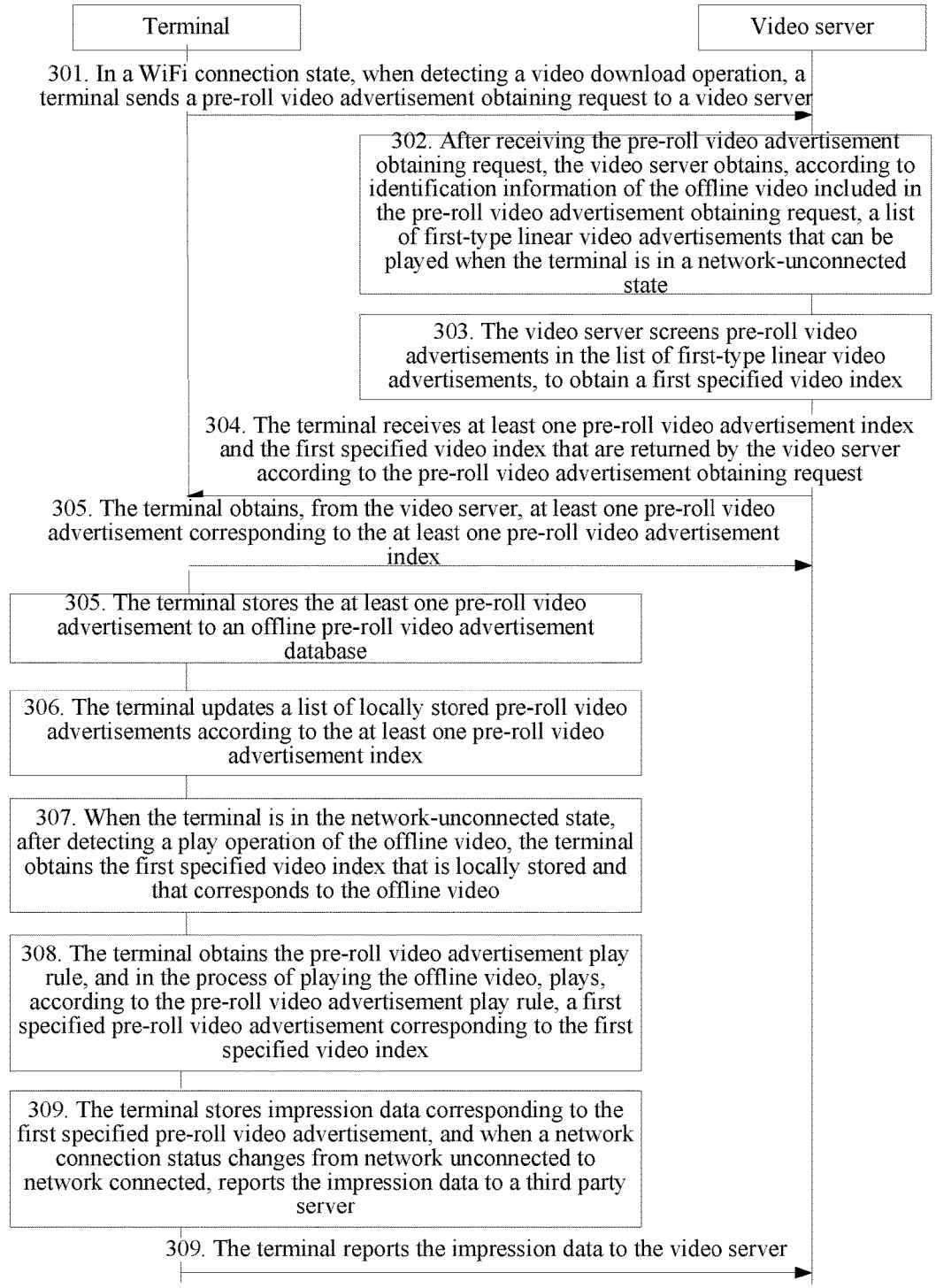
FIG. 3a is a flowchart of a pre-roll advertisement playing method according to an embodiment of the present invention.

FIG. 3a is a flowchart of a pre-roll advertisement playing method according to an embodiment of the present invention. A terminal and a video server interact with each other. Referring to FIG. 3a, a process of the method provided in this embodiment of the present invention includes:

301: In a WiFi connection state, when detecting a video download operation, a terminal sends a pre-roll advertisement obtaining request to a video server.

In this embodiment of the present invention, a video sharing website application sets a video download button on a details page or a download page of each video. After detecting a click operation of the video download button, the terminal determines that the video download operation is detected. After downloading a corresponding video from the video server, the terminal obtains an offline video that can be played even if in a network-unconnected state. In another embodiment, when sending a video download request to the video server, the terminal further sends the pre-roll advertisement obtaining request to the video server. In this way, a pre-roll advertisement corresponding to the offline video is downloaded to the terminal along with the offline video. One offline video may correspond to multiple pre-roll advertisements. At present, in a process of playing an offline video, only one pre-roll advertisement is usually played. Therefore, when one offline video corresponds to multiple pre-roll advertisements, when playing the offline video, the terminal selects one pre-roll advertisement from the multiple pre-roll advertisements and plays the pre-roll advertisement. For example, when a user plays the offline video for the first time, one of the pre-roll advertisements is played. When the user plays the offline video for the second time, another pre-roll advertisement is played. A pre-roll advertisement specifically played may be selected in advance by the video server. The terminal only needs to pull a corresponding pre-roll advertisement from an offline pre-roll advertisement database according to a selection result and plays the pre-roll advertisement. Alternatively, the video server may help the terminal to select a pre-roll advertisement. The terminal sends a request to the video server. The video server determines a pre-roll advertisement additionally played when the offline video is played, and feeds back the selection result to the terminal. After receiving the selection result delivered by the video server, the terminal pulls a corresponding pre-roll advertisement from the offline pre-roll advertisement database or a buffered pre-roll advertisement database and plays the pre-roll advertisement.

The terminal includes two databases for storing pre-roll advertisements. One is the buffered pre-roll advertisement database, used for storing a pre-roll advertisement buffered by the terminal when a video is watched online in a WiFi connection state. Another is the offline pre-roll advertisement database, used for storing a pre-roll advertisement downloaded along with an offline video when the terminal downloads the offline video in the WiFi state. The buffered pre-roll advertisement database and the offline pre-roll advertisement database that are described above provide materials for additionally playing a pre-roll advertisement when the terminal subsequently plays an offline video in a non-WiFi state.

In addition, the pre-roll advertisement obtaining request includes at least identification information of the offline video. The identification information may be all information that can be used for identifying the offline video, such as a name of the offline video, information about a user downloading the offline video, and a poster of the offline video. This is not specifically limited in this embodiment of the present invention.

302: After receiving the pre-roll advertisement obtaining request, the video server obtains, according to identification information of the offline video included in the pre-roll advertisement obtaining request, a list of first-type pre-roll advertisements that can be played when the terminal is in a network-unconnected state.

In this embodiment of the present invention, the video server stores massive pre-roll advertisements placed by various advertisers. After receiving the pre-roll advertisement obtaining request, the video server may select, from the massive pre-roll advertisements, a pre-roll advertisement menu set according to conditions such as a time length of the offline video, content of the offline video, and whether the pre-roll advertisement may be downloaded or played, and determine the pre-roll advertisement menu set as the list of first-type pre-roll advertisements that can be played when the terminal is in the network-unconnected state. The list of first-type pre-roll advertisements that can be played includes at least one pre-roll advertisement index. The pre-roll advertisement index is used for identifying the pre-roll advertisement, and the pre-roll advertisement index may be a character string. A form of the pre-roll advertisement index is not specifically limited in this embodiment of the present invention.

303: The video server screens pre-roll advertisements in the list of first-type pre-roll advertisements, to obtain a first specified video index.

In this embodiment of the present invention, the first specified video index refers to an index of a pre-roll advertisement additionally played before content of an offline video is formally played or in a process in which the content is played when the offline video is subsequently played in the network-unconnected state. That is, in this step, the video server selects the pre-roll advertisement that is additionally played when the terminal plays the offline video. If the terminal plays the offline video in the network-unconnected state in a subsequent process, the foregoing pre-roll advertisement selected by the video server is directly played. If the terminal plays the offline video in a cellular network connection state in the subsequent process, the terminal may not use a selection result of the video server, and instead, send a pre-roll advertisement menu request in real time to the video server, so as to request the video server to select a pre-roll advertisement in real time in a process of playing the offline video. For a detailed process, refer to subsequent step 310 to step 316.

The video server may select an additionally played pre-roll advertisement in the following manners:

In a first step, the pre-roll advertisements in the list of first-type pre-roll advertisements are filtered, to obtain the first list of pre-roll advertisements.

A filtering manner includes static filtering and dynamic filtering. The static filtering includes manners such as region filtering and age filtering. The region filtering refers to filtering out a pre-roll advertisement for another region according a home location of a user of the terminal. For example, if the user of the terminal is in Shanghai, a pre-roll advertisement for a special offer of Starbucks in Beijing is filtered out. The age filtering considers an audience of a pre-roll advertisement. For example, if an age bracket of users of the terminal is 10 years old to 20 years old, a pre-roll advertisement for mother and baby products and the like needs to be filtered out.

For the region filtering, current geographical location information of the terminal may be obtained by using a positioning module built in the terminal, and the geographical location information is carried in the pre-roll advertisement obtaining request, so that after receiving the pre-roll advertisement obtaining request including the geographical location information, the video server performs region filtering according to the geographical location information. For the age filtering, age information of a user may be obtained based on registration information of the user. At present, most video applications provide a user registration function. When performing user registration, a user usually writes information such as a nickname, an age, a gender, and an occupation. Therefore, the pre-roll advertisement obtaining request may further carry information such as a user nickname that is used for uniquely identifying the identity of the user, so that the video server obtains the age information according to the information. In addition, in addition to the region filtering and the age filtering, the static filtering may further include another filtering manner such as occupation filtering. This is not specifically limited in this embodiment of the present invention. In this way, when a pre-roll advertisement is selected, one or more similar pre-roll advertisements may be used for a particular group of people by using a user tag. Details may be shown in Table 1. Therefore, a pre-roll advertisement is played in a more targeted and precise manner, and more placing scenarios may be expanded in the future.

TABLE 1

| Tags | Locations at which a terminal is used to watch a video | Pre-roll advertisements suitable to place |
| --- | --- | --- |
| Travelers | Hotels | Tourism products and food |
| Business travelers | Airports, planes, and hotels | Luxuries |
| Office workers and white-collar workers | Buses, subways, and taxis | Videos and automobiles |
| Individual bosses | Shops | Games and 2B products |
| . . . | . . . | . . . |

Before the dynamic filtering is performed, the video server may generate, in advance, a menu of pre-roll advertisements that cannot be currently played and a menu of pre-roll advertisements that can be buffered. An intersection of a static filtering result and the menu of the pre-roll advertisement that can be buffered is obtained, and then the dynamic filtering is performed after the result is obtained. Alternatively, an intersection of inverse sets of a static filtering result and the menu of the pre-roll advertisements that cannot be currently played is obtained, and then the dynamic filtering is performed after the result is obtained. The first situation described above is applicable to a case in which the terminal subsequently plays the offline video in the network-unconnected state. The second situation described above is applicable to a case in which the terminal subsequently plays the offline video in the cellular network connection state.

In a second step, the pre-roll advertisements in the first list of pre-roll advertisements are screened according to a video targeting condition, to obtain a second list of pre-roll advertisements.

The video targeting condition may include a pre-roll advertisement play range and a pre-roll advertisement play time that are stipulated by an advertiser and the like. This is not specifically limited in this embodiment of the present invention.

In a third step, a pre-roll advertisement satisfying a menu condition is selected from the second list of pre-roll advertisements, to obtain a first specified video index.

When a menu is selected, indexes of one or more pre-roll advertisements may be selected from all remaining pre-roll advertisements obtained after the filtering in the first step and the second step, and the indexes are determined as the first specified video index. Alternatively, after a cost per day (CPD) menu and a CPD segment menu are used, indexes of one or more pre-roll advertisements included in a selection result may be determined as the first specified video index. The CPD menu refers to selecting a menu according to costs of a pre-roll advertisement each day. The CPD segment menu refers to selecting a menu according to costs of a pre-roll advertisement each day and a time segment of playing the pre-roll advertisement. At present, the terminal plays only one pre-roll advertisement in the non-WiFi connection state. Certainly, the terminal may play multiple pre-roll advertisements. That is, before content of the offline video is played or in a process in which the content is played, multiple pre-roll advertisements are successively played. This is not specifically limited in this embodiment of the present invention. In this embodiment of the present invention, an example in which there is only one first specified video index is used for description.

304: The terminal receives at least one pre-roll advertisement index and the first specified video index that are returned by the video server according to the pre-roll advertisement obtaining request.

The at least one pre-roll advertisement index corresponds to the offline video. The first specified video index is a menu result of the video server, and is included in the at least one pre-roll advertisement index. The terminal subsequently plays an offline video in the network-unconnected state also based on the first specified video index. The at least one pre-roll advertisement index may be all video indexes in the list of pre-roll advertisements that can be played, or may be some video indexes except pre-roll advertisements that cannot be downloaded. This is not specifically limited in this embodiment of the present invention.

It should be noted that in a process of obtaining the pre-roll advertisement index, the terminal also downloads the offline video from the video server. After receiving the at least one pre-roll advertisement index returned by the video server, the terminal stores the at least one pre-roll advertisement index. In addition, in a process of obtaining the pre-roll advertisement index, a pre-roll advertisement play rule may be simultaneously obtained from the video server, so as to play the pre-roll advertisement in a subsequent process according to the pre-roll advertisement play rule. The pre-roll advertisement play rule may include a time length of playing a pre-roll advertisement before the content of the offline video is formally played or in the process in which the content is played, a quantity of pre-roll advertisements to be played, or an update period of pre-roll advertisement materials. This is not specifically limited in this embodiment of the present invention. After the terminal obtains the pre-roll advertisement play rule from the video server, the video server may update the pre-roll advertisement play rule in a subsequent process as time elapses. Therefore, in the subsequent process, when the terminal is in the WiFi connection state or the cellular network connection state, the terminal may further automatically pull the newest pre-roll advertisement play rule of the video server, and replace the previously stored pre-roll advertisement play rule with the newest pre-roll advertisement play rule. This is not limited in this embodiment of the present invention either. The method shown in step 301 to step 304 may be specifically implemented by using an advertisement plug-in installed on the terminal. This is not specifically limited in this embodiment of the present invention.

305: The terminal obtains, from the video server, at least one pre-roll advertisement corresponding to the at least one pre-roll advertisement index, and stores the at least one pre-roll advertisement to an offline pre-roll advertisement database.

In this embodiment of the present invention, after the video server determines the at least one pre-roll advertisement index corresponding to the offline video, the at least one pre-roll advertisement corresponding to the at least one pre-roll advertisement index is obtained from the video server, and the at least one pre-roll advertisement is sent to the terminal. After receiving the at least one pre-roll advertisement sent by the video server, the terminal stores the at least one pre-roll advertisement to the offline pre-roll advertisement database.

The video server may be a content delivery network (CDN) server, which may store massive pre-roll advertisement materials. In addition, in this embodiment of the present invention, the pre-roll advertisement materials may also be stored in an independent CDN server. The video server may pull a corresponding pre-roll advertisement from the independent CDN server when needed. A storage manner of the pre-roll advertisement is not specifically limited in this embodiment of the present invention.

306: The terminal updates a list of locally stored pre-roll advertisements according to the at least one pre-roll advertisement index.

In this embodiment of the present invention, the terminal stores the list of pre-roll advertisements. When the terminal downloads an offline video, an advertisement plug-in installed on the terminal pulls at least one pre-roll advertisement index corresponding to the offline video. Therefore, the list of locally stored pre-roll advertisements needs to be updated according to the at least one pre-roll advertisement index, so that the terminal learns all locally stored pre-roll advertisement indexes in time.

Step 301 to step 306 are a process of obtaining the pre-roll advertisement index and downloading the pre-roll advertisement when the terminal downloads the offline video in the WiFi state. Therefore, it is implemented that a pre-roll advertisement resource is requested from the video server in advance, so that the terminal subsequently plays the pre-roll advertisement in the non-WiFi connection state. Play procedures of the pre-roll advertisement are different according to different network connection statuses in which the terminal plays the offline video. Therefore, when a play operation of the offline video is detected (for example, after it is detected that a play button of a video player is clicked), a current network connection status of the terminal needs to be first determined. When both a WiFi connection function and a cellular network connection function of the terminal are forbidden, that is, when the terminal plays the offline video in the network-unconnected state, for a play procedure of the pre-roll advertisement, refer to the following step 307 to step 309. When a WiFi connection function of the terminal is forbidden but a cellular network connection function is enabled, that is, when the terminal plays the offline video in the cellular network connection state, for a play procedure of the pre-roll advertisement, refer to the following step 310 to step 316.

307: When the terminal is in the network-unconnected state, after detecting a play operation of the offline video, the terminal obtains the first specified video index that is locally stored and that corresponds to the offline video.

In this embodiment of the present invention, because the terminal is currently in the network-unconnected state, the terminal cannot request from the video server in real time a pre-roll advertisement to be played. Therefore, in this case, a pre-roll advertisement is played according to the first specified video index and the at least one pre-roll advertisement that are downloaded along with the offline video when the terminal is in the WiFi state in step 304 and Step 305. During specific implementation, the terminal may obtain, from the offline pre-roll advertisement database, a specified pre-roll advertisement corresponding to the first specified video index.

308: The terminal obtains the pre-roll advertisement play rule, and in the process of playing the offline video, plays, according to the pre-roll advertisement play rule, a first specified pre-roll advertisement corresponding to the first specified video index.

In this embodiment of the present invention, the terminal is currently in the network-unconnected state. Therefore, the terminal obtains the locally buffered pre-roll advertisement play rule. Then, the first specified pre-roll advertisement corresponding to the first specified video index is played according to the locally buffered pre-roll advertisement play rule. For example, the first specified pre-roll advertisement is played once according to the locally buffered pre-roll advertisement play rule before the content of the offline video is formally played; or the first specified pre-roll advertisement is played once according to the locally buffered pre-roll advertisement play rule in a time segment of a process of playing the content of the offline video.

309: The terminal stores advertisement viewing data corresponding to the first specified pre-roll advertisement, and when a network connection status changes from network-unconnected to network-connected, reports the advertisement viewing data to the video server and a third party server.

In this embodiment of the present invention, the advertisement viewing data is used for collecting statistics on an exposure time of the pre-roll advertisement on the terminal. Therefore, the advertisement viewing data includes a local play time of the pre-roll advertisement, and in addition to the local play time of the pre-roll advertisement, the advertisement viewing data may further include page views of the pre-roll advertisement, a geographical location at which the pre-roll advertisement is played, and the like. Content included in the advertisement viewing data is not specifically limited in this embodiment of the present invention. In addition, the pre-roll advertisement is played without a network. Therefore, after receiving the advertisement viewing data, the video server may further add an offline identifier to the advertisement viewing data (for example, assigning a particular value to the parameter "offline," which represents being offline), so that the video server collects statistics on play of the pre-roll advertisement according to the offline identifier, so as to perform subsequent data analysis.

It should be noted that to enable an advertiser to learn a play status of a pre-roll advertisement in time, the method provided in this embodiment of the present invention further includes the step of reporting the advertisement viewing data to the third party server. A provider of the third party server is equivalent to a notary organization (for example, Miaozhen and Nelson). The advertiser may obtain various statistics data such as times a pre-roll advertisement is played in a single day, total times a pre-roll advertisement is played, and a user feedback from the notary organization. The various statistics data may be obtained by means of statistics collection by analyzing the reported advertisement viewing data. Therefore, the advertisement plug-in, that is, an advertisement software development kit (SDK) module, installed on the terminal, may include an SDK module of a provider of the third party server.

Further, the foregoing step of reporting the advertisement viewing data to the third party server may be completed by the video server. That is, when changing from network unconnected to network connected, the terminal may report the advertisement viewing data only to the video server. After receiving the advertisement viewing data, the video server may add information about a time of receiving the advertisement viewing data to the advertisement viewing data, and then report the advertisement viewing data carrying the time information to the third party server. A specific manner for reporting the advertisement viewing data to the third party server is not specifically limited in this embodiment of the present invention.

Figure 3B:
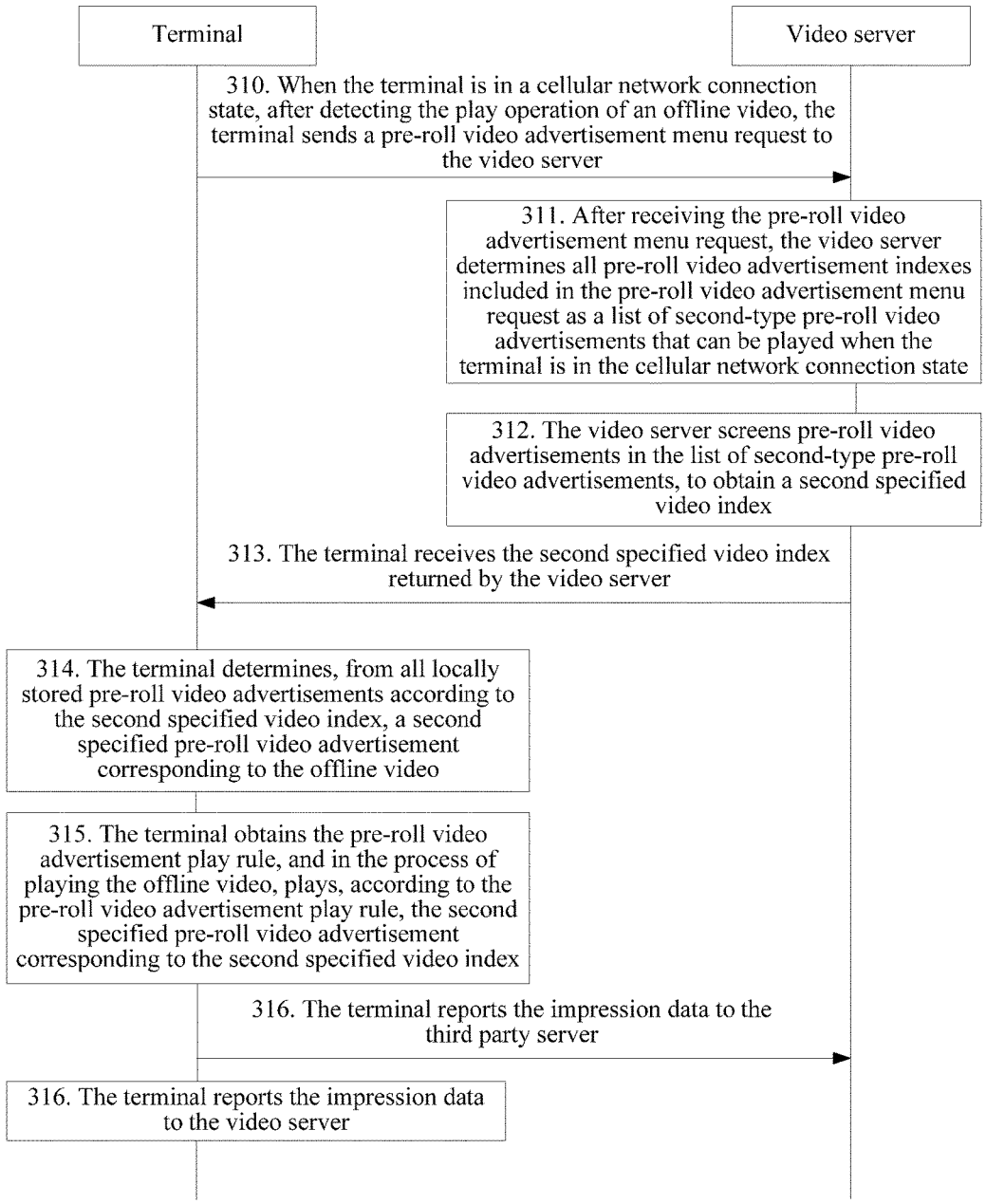
FIG. 3b is a flowchart of a pre-roll advertisement playing method according to an embodiment of the present invention.

The embodiment shown in step 301 to step 309 implements play of the pre-roll advertisement in the process of playing the offline video when the terminal is in the network-unconnected state. How the pre-roll advertisement is played in the process of playing the offline video when the terminal is in the cellular network connection state is described in detail below based on step 301 to step 306. Referring to FIG. 3b, when the terminal plays the offline video in the cellular network connection state, a process of playing the pre-roll advertisement is as follows:

310: When the terminal is in a cellular network connection state, after detecting the play operation of the offline video, the terminal sends a pre-roll advertisement menu request to the video server.

The pre-roll advertisement menu request includes at least all locally stored pre-roll advertisement indexes. All the pre-roll advertisement indexes are the total quantity of video indexes in the buffered pre-roll advertisement database and the offline pre-roll advertisement database. This is not specifically limited in this embodiment of the present invention. Certainly, the pre-roll advertisement menu request may further include identification information of the offline video, and the like. This is not specifically limited in this embodiment of the present invention.

311: After receiving the pre-roll advertisement menu request, the video server determines all pre-roll advertisement indexes included in the pre-roll advertisement menu request as a list of second-type pre-roll advertisements that can be played when the terminal is in the cellular network connection state.

Video materials corresponding to all the pre-roll advertisement indexes are stored in the terminal. Therefore, the list of second-type pre-roll advertisements that can be played may include all the pre-roll advertisement indexes.

312: The video server screens pre-roll advertisements in the list of second-type pre-roll advertisements, to obtain a second specified video index.

A specific implementation manner of this step is similar to that of step 303. Details are not described herein again.

313: The terminal receives the second specified video index returned by the video server.

In this embodiment of the present invention, after determining the second specified video index corresponding to the offline video, the video server directly feeds back a menu result including the second specified video index to the terminal. The terminal has stored the second specified pre-roll advertisement corresponding to the second specified video index. Therefore, there is no need to pull a video material from the video server.

314: The terminal determines, from all locally stored pre-roll advertisements according to the second specified video index, a second specified pre-roll advertisement corresponding to the offline video.

In this embodiment of the present invention, the terminal stores a correspondence between the pre-roll advertisement index and the pre-roll advertisement. Therefore, the terminal may search for the second specified pre-roll advertisement in the buffered pre-roll advertisement database and the offline pre-roll advertisement database according to the second specified video index.

315: The terminal obtains the pre-roll advertisement play rule, and in the process of playing the offline video, plays, according to the pre-roll advertisement play rule, the second specified pre-roll advertisement corresponding to the second specified video index.

The terminal is currently in the cellular network connection state. Therefore, the terminal may send a play rule obtaining request to the video server, so that after receiving the play rule obtaining request, the video server delivers a newest pre-roll advertisement play rule to the terminal.

In this embodiment of the present invention, when playing the second specified pre-roll advertisement, the terminal may play the second specified pre-roll advertisement according to the newest pre-roll advertisement play rule. For example, the second specified pre-roll advertisement is played once before the content of the offline video is formally played; or the second specified pre-roll advertisement is played once in a time segment of the process of playing the content of the offline video. This is not specifically limited in this embodiment of the present invention.

316: The terminal reports the advertisement viewing data to the video server and the third party server.

The terminal is currently in the cellular network connection state. Therefore, the advertisement viewing data may be simultaneously reported to the video server and the third party server in real time. When the terminal is in a 3G connection state or a 4G connection state, the terminal reports in real time the advertisement viewing data stored in the terminal to the video server and the third party server. When the terminal is in a 2G connection state, the terminal flexibly reports the advertisement viewing data stored in the terminal to the video server and the third party server. This is not specifically limited in this embodiment of the present invention. In addition, after receiving the advertisement viewing data, the video server may further write, to the advertisement viewing data, the information about the time of receiving the advertisement viewing data by the video server.

It should be noted that when the network connection status changes from the non-WiFi connection state to the WiFi connection state, the pre-roll advertisement index corresponding to the offline video may be updated. When the new pre-roll advertisement index is detected, a pre-roll advertisement corresponding to the new pre-roll advertisement index is downloaded. When the terminal is in the non-WiFi connection state, and after detecting the play operation of the offline video, the terminal plays the new pre-roll advertisement. Alternatively, multiple pre-roll advertisements corresponding to the offline video are locally stored. To implement playing pre-roll advertisements by turns, after the terminal plays one pre-roll advertisement for a preset time length, if it is detected that the terminal is in the WiFi connection state, a menu of pre-roll advertisements may be re-selected for the offline video, and a pre-roll advertisement correspondingly played when the terminal plays the offline video in the non-WiFi connection state is updated. In addition, if the video server cannot select, from the multiple pre-roll advertisements, the pre-roll advertisement corresponding to the offline video, the terminal may not play a pre-roll advertisement, that is, directly play the offline video after detecting the play operation of the offline video.

It should be noted that in this embodiment of the present invention, a pre-roll advertisement is played according to a preset pre-roll advertisement processing logic and a pre-roll advertisement play requirement of an advertiser. After an order of the advertiser officially takes effect, from the very day when the order takes effect, a user watches the pre-roll advertisement if the user watches the offline video corresponding to the pre-roll advertisement. That is, the pre-roll advertisement taking effect on the very day appears on the very day in a process of playing a corresponding video. The foregoing processing logic can be implemented because the pre-roll advertisement has been sent to the terminal before the order formally takes effect. For example, a user downloads an offline video on September 1, an advertiser formally places a pre-roll advertisement on October 1, that is, the pre-roll advertisement formally takes effect on October 1, and the video server associates the pre-roll advertisement with the offline video. In this case, as long as the terminal is connected to WiFi in first three days from October 1 according to the pre-roll advertisement processing logic, the pre-roll advertisement index and pre-roll advertisement materials are locally updated. In addition, if the advertiser has a play time requirement, the pre-roll advertisement is played according to the play time required by the advertiser. For example, the play time required by the advertiser is from 6 p.m. to 8 p.m. If the user performs the play operation of the offline video on 7 p.m. in the non-WiFi state, the pre-roll advertisement is additionally played in the process of playing the offline video.

According to the method provided in this embodiment of the present invention, after detecting a play operation of an offline video, a terminal determines a current network connection status of the terminal. Even if it is determined that the terminal is currently in a non-WiFi connection state such as a network-unconnected state or a cellular network connection state, a pre-roll advertisement matching the offline video may be determined by using a video server, and in the process of playing the offline video, a pre-roll advertisement matching the offline video is selected for playing, thereby achieving an objective of additionally playing a pre-roll advertisement when the offline video is played in the non-WiFi connection state, expanding an audience range of the pre-roll advertisement, and relatively widening an application range. Therefore, brand or product information that a pre-roll advertisement intends to promote are widely spread relatively effectively.

Figure 4:
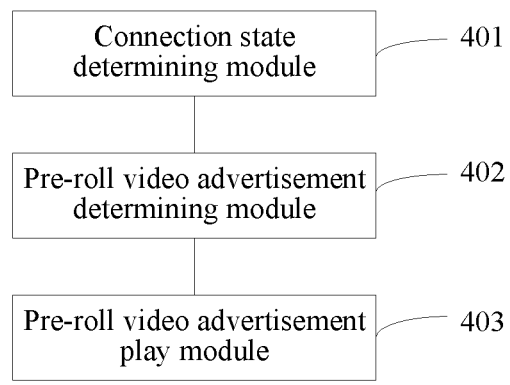
FIG. 4 is a schematic structural diagram of a pre-roll advertisement playing apparatus according to an embodiment of the present invention.

FIG. 4 is a schematic structural diagram of a pre-roll advertisement playing apparatus according to an embodiment of the present invention. The apparatus is applied to a terminal. Referring to FIG. 4, the apparatus includes: a connection state determining module 401, a pre-roll advertisement determining module 402, and a pre-roll advertisement play module 403.

The connection state determining module 401 is connected to the pre-roll advertisement determining module 402, and is configured to: after a play operation of an offline video is detected, determine a current network connection status of the terminal. The pre-roll advertisement determining module 402 is connected to the pre-roll advertisement play module 403, and is configured to: when the terminal is in a first connection state, determine, among multiple pre-roll advertisements obtained by the terminal, a specified pre-roll advertisement corresponding to the offline video. The pre-roll advertisement play module 403 is configured to play the specified pre-roll advertisement in a process of playing the offline video.

Optionally, the apparatus further includes: a video obtaining and sending module, configured to: in a second connection state, when a video download operation is detected, send a pre-roll advertisement obtaining request to a video server; a video index receiving module, configured to receive at least one pre-roll advertisement index returned by the video server according to the pre-roll advertisement obtaining request; a pre-roll advertisement obtaining module, configured to: obtain at least one pre-roll advertisement corresponding to the at least one pre-roll advertisement index, and store the at least one pre-roll advertisement; and a video list update module, configured to: update a list of locally stored pre-roll advertisements according to the at least one pre-roll advertisement index.

Optionally, the pre-roll advertisement determining module is configured to: when the terminal is in a third connection state, send a pre-roll advertisement menu request to the video server, where the pre-roll advertisement menu request includes at least all locally stored pre-roll advertisement indexes, so that the video server selects, from all the pre-roll advertisement indexes, a specified video index matching the offline video; receive the specified video index returned by the video server; and determine, in all locally stored pre-roll advertisements according to the specified video index, the specified pre-roll advertisement corresponding to the offline video.

Optionally, the pre-roll advertisement determining module is configured to: when the terminal is in a network-unconnected state, obtain a specified video index returned by the video server, where the specified video index is selected by the video server from the at least one pre-roll advertisement index; and determine a pre-roll advertisement corresponding to the specified video index as the specified pre-roll advertisement corresponding to the offline video.

Optionally, the pre-roll advertisement play module is configured to: obtain a pre-roll advertisement play rule; and play the specified pre-roll advertisement according to the pre-roll advertisement play rule in the process of playing the offline video.

Optionally, the pre-roll advertisement play module is configured to: when the terminal is in the network-unconnected state, obtain the locally stored pre-roll advertisement play rule; and when the terminal is in the third connection state, send a play rule obtaining request to the video server, so that after receiving the play rule obtaining request, the video server delivers the pre-roll advertisement play rule to the terminal.

Optionally, the apparatus further includes: a video index update module, configured to: when the network connection status changes from the first connection state to the second connection state, update a pre-roll advertisement index corresponding to the offline video; a pre-roll advertisement download module, configured to: when a new pre-roll advertisement index is detected, download a pre-roll advertisement corresponding to the new pre-roll advertisement index; a pre-roll advertisement update module, configured to: when the terminal is in the first connection state, after the play operation of the offline video is detected, update the specified pre-roll advertisement corresponding to the offline video; and a pre-roll advertisement play module, configured to play the updated specified pre-roll advertisement in the process of playing the offline video.

Optionally, the apparatus further includes: an advertisement viewing data report module, configured to: when the network connection status is network-unconnected, after the specified pre-roll advertisement is played, store advertisement viewing data corresponding to the specified pre-roll advertisement, where the advertisement viewing data includes at least a local play time of a pre-roll advertisement; when the network connection status changes from network-unconnected to network-connected, report the advertisement viewing data to the video server and a third party server; or when the network connection status is the third connection state, after the specified pre-roll advertisement is played, report the advertisement viewing data to the video server and a third party server.

Optionally, the first connection state refers to a non-WiFi connection state.

According the apparatus provided in this embodiment of the present invention, after detecting the play operation of the offline video, the terminal determines the current network connection status of the terminal. Even if it is determined that the terminal is in a non-WiFi connection state such as a network-unconnected state or a cellular network connection state, a pre-roll advertisement matching the offline video may be determined by using a video server, and in the process of playing the offline video, a pre-roll advertisement matching the offline video is selected for playing, thereby achieving an objective of additionally playing a pre-roll advertisement when the offline video is played in the non-WiFi connection state, expanding an audience range of the pre-roll advertisement, and relatively widening an application range. Therefore, brand or product information that a pre-roll advertisement intends to promote are widely spread relatively effectively.

Figure 5:
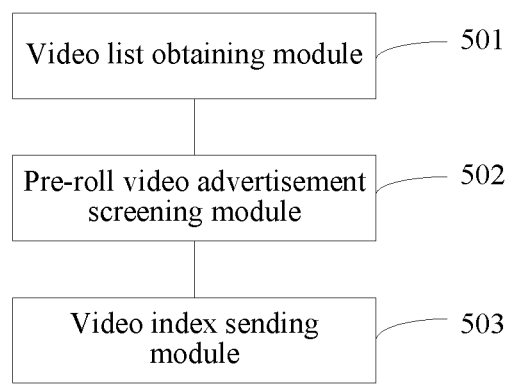
FIG. 5 is a schematic structural diagram of a pre-roll advertisement playing apparatus according to an embodiment of the present invention.

FIG. 5 is a schematic structural diagram of a pre-roll advertisement playing apparatus according to an embodiment of the present invention. The apparatus is applied to a video server. Referring to FIG. 5, the apparatus includes: a video list obtaining module 501, a pre-roll advertisement screening module 502, and a video index sending module 503.

The video list obtaining module 501 is connected to the pre-roll advertisement screening module 502, and is configured to obtain a list of pre-roll advertisements that can be played when a terminal is in a first connection state. The pre-roll advertisement screening module 502 is connected to the video index sending module 503, and is configured to screen pre-roll advertisements in the list of pre-roll advertisements, to obtain a specified video index. The video index sending module 503 is configured to return the specified video index to the terminal, so that the terminal determines, according to the specified video index and among multiple pre-roll advertisements obtained by the terminal, a specified pre-roll advertisement corresponding to a to-be-played offline video, and plays a specified pre-roll advertisement corresponding to the specified video index the first connection state.

Optionally, the video list obtaining module is configured to: when the terminal plays an offline video in a third connection state, receive a pre-roll advertisement menu request sent by the terminal, where the pre-roll advertisement menu request includes at least all pre-roll advertisement indexes locally stored by the terminal; and determine all the pre-roll advertisement indexes as the list of pre-roll advertisements that can be played when the terminal is in the first connection state.

Optionally, the video list obtaining module is configured to: receive a pre-roll advertisement obtaining request sent by the terminal, where the pre-roll advertisement obtaining request is sent after the terminal detects a download operation of the offline video, and the pre-roll advertisement obtaining request includes at least identification information of the offline video; and obtain, according to the identification information of the offline video, the list of pre-roll advertisements that can be played when the terminal is in the first connection state.

Optionally, the apparatus further includes: a pre-roll advertisement obtaining module, configured to obtain a specified pre-roll advertisement corresponding to the specified pre-roll advertisement index; and a pre-roll advertisement sending module, configured to send the specified pre-roll advertisement to the terminal.

Optionally, the pre-roll advertisement screening module is configured to: filter pre-roll advertisements in the list of pre-roll advertisements, to obtain a first list of pre-roll advertisements; screen pre-roll advertisements in the first list of pre-roll advertisements according to a video targeting condition, to obtain a second list of pre-roll advertisements; and select, from the second list of pre-roll advertisements, a pre-roll advertisement satisfying a menu condition, to obtain the specified video index.

According the apparatus provided in this embodiment of the present invention, after detecting the play operation of the offline video, the terminal determines the current network connection status of the terminal. Even if it is determined that the terminal is in a non-WiFi connection state such as a network-unconnected state or a cellular network connection state, a pre-roll advertisement matching the offline video may be determined by using a video server, and in the process of playing the offline video, a pre-roll advertisement matching the offline video is selected for playing, thereby achieving an objective of additionally playing a pre-roll advertisement when the offline video is played in the non-WiFi connection state, expanding an audience range of the pre-roll advertisement, and relatively widening an application range. Therefore, brand or product information that a pre-roll advertisement intends to promote are widely spread relatively effectively.

It should be noted that when the pre-roll advertisement playing apparatus provided in the foregoing embodiment plays a pre-roll advertisement, classification of the foregoing functional modules are used only for an exemplary description. In actual application, the foregoing functions may be allocated to different functional modules for implementation according to requirements. That is, an internal structure of a device is divided into different functional modules, so as to finish all or a part of the functions described above. In addition, the pre-roll advertisement playing apparatus provided by the foregoing embodiment and the embodiment of the pre-roll advertisement playing method relate to a same concept. For a specific implementation process thereof, refer to the method embodiment. Details are not described herein again.

Figure 6:
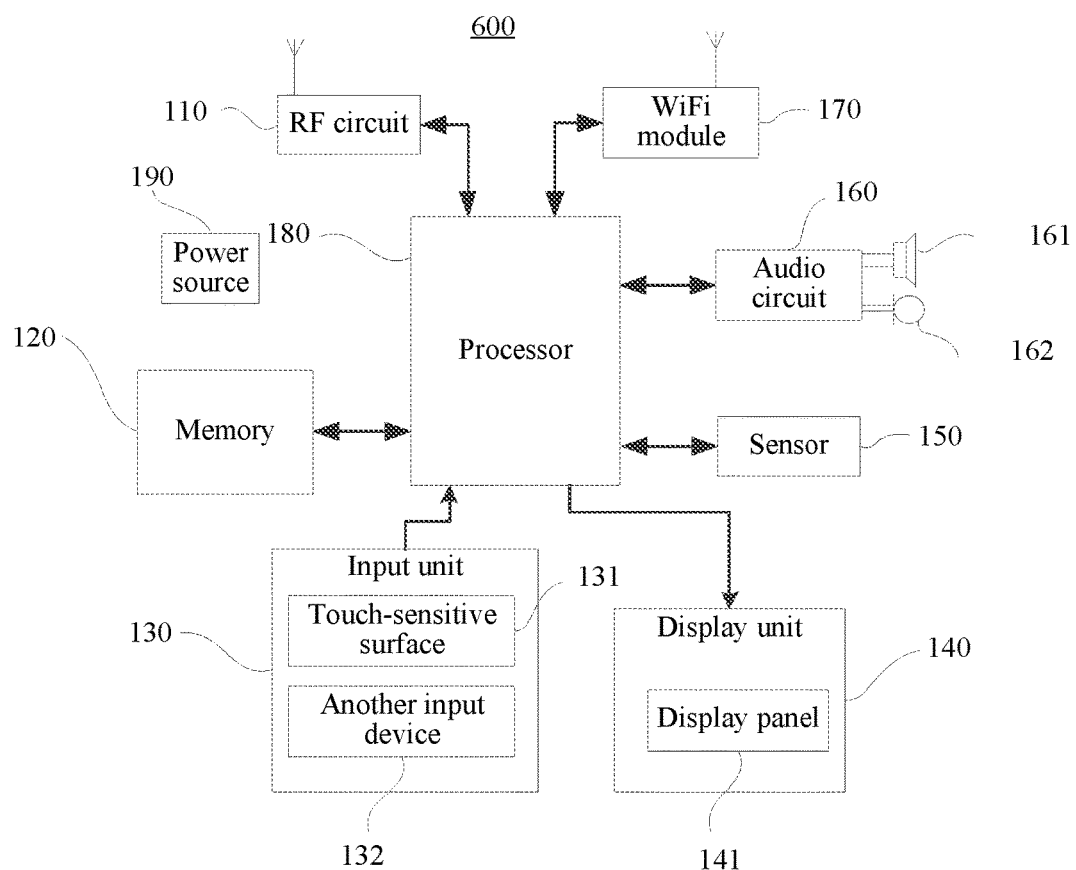
FIG. 6 is a schematic structural diagram of a terminal according to an embodiment of the present invention.

FIG. 6 shows a terminal according to an embodiment of the present invention. The terminal may be configured to execute the pre-roll advertisement playing method provided in the foregoing embodiment. Referring to FIG. 6, the terminal 600 include: components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power source 190. A person skilled in the art may understand that a terminal structure shown in FIG. 6 constitutes no limitation to the terminal, and the terminal may include more or fewer components than those shown in the figure, or some components may be combined, or a different component deployment may be used.

The RF circuit 110 may be configured to receive and send signals during an information receiving and sending process or a call process, particularly, after receiving downlink information of a base station, deliver the downlink information of the base station to one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by means of wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), an e-mail, and a Short Messaging Service (SMS).

The storage 120 may be configured to store a software program and module. The processor 180 runs the software program and module stored in the memory 120, to implement various functional applications and data processing. The memory 120 may mainly include a program storage area and a data storage area, where the program storage area may store an operating system, an application program required by at least one function (such as a sound play function and an image display function), and the like; and the program storage area may store data (such as audio frequency data and an address book) created according to the use of the terminal 600, and the like. In addition, the memory 120 may include a high-speed random access memory, and may also include a non-volatile memory such as at least one disk storage device, a flash memory device, or another volatile solid-state storage device. Correspondingly, the memory 120 may further include a memory controller, so as to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, or a joystick.

The display unit 140 may be configured to display information input by the user or information provided for the user, and various graphical user interfaces of the terminal 600. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although in FIG. 6, the touch-sensitive surface 131 and the display panel 141 are used as two separate parts to implement input and output functions, in some embodiments, the touch-sensitive surface 131 and the display panel 141 may be integrated to implement the input and output functions.

The terminal 600 may further include at least one sensor 150, for example, an optical sensor, a motion sensor and other sensors. Specifically, the optical sensor may include an ambient light sensor and a proximity sensor, where the ambient light sensor may adjust brightness of the display panel 141 according to luminance of the ambient light. The proximity sensor may switch off the display panel 141 and/or backlight when the terminal 600 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 600 are not further described herein.

The audio circuit 160, a speaker 161, and a microphone 162 may provide an audio interface between the user and the terminal 600. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 600.

WiFi is a short distance wireless transmission technology. The terminal 600 may help, by using the WiFi module 170, the user to receive and send e-mails, browse a webpage, access streaming media, and so on. WiFi provides wireless broadband Internet access for the user.

The processor 180 is a control center of the terminal 600, and is connected to various parts of the mobile phone by using various interfaces and lines. By running or executing the software program and/or module stored in the memory 120, and invoking data stored in the memory 120, the processor 180 performs various functions and data processing of the terminal 600, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem processor may not be integrated into the processor 180.

The terminal 600 further includes the power source 190 (for example, a battery) that supplies power to various components. Preferably, the power source may be logically connected to the processor 180 by using a power management system, so as to implement a function such as charging, discharging, and power consumption management by using the power management system. The power source 190 may further include one or more of a direct current or alternate current power source, a re-charging system, a power source fault detection circuit, a power source converter or an inverter, a power source state indicator, or any other components.

Although not shown in the figure, the terminal 600 may further include a camera, a Bluetooth module, and the like, and details are not described herein. Specifically, in this embodiment, the display unit of the terminal is a touchscreen display, and the terminal further includes a memory and one or more computer programs, where the one or more computer programs are stored in the memory, and are configured to be executed by one or more processors. The one or more programs include instructions for performing the following operations:

Optionally, before the determining a current network connection status of a terminal, the method further includes: in a second connection state, when detecting a video download operation, sending a pre-roll advertisement obtaining request to a video server; receiving at least one pre-roll advertisement index returned by the video server according to the pre-roll advertisement obtaining request; obtaining at least one pre-roll advertisement corresponding to the at least one pre-roll advertisement index, and storing the at least one pre-roll advertisement; and updating a list of locally stored pre-roll advertisements according to the at least one pre-roll advertisement index.

Optionally, the determining, among multiple pre-roll advertisements obtained by the terminal, a specified pre-roll advertisement corresponding to the offline video includes: when the terminal is in a third connection state, sending a pre-roll advertisement menu request to the video server, where the pre-roll advertisement menu request includes at least all locally buffered pre-roll advertisement indexes, so that the video server selects, from all the pre-roll advertisement indexes, a specified video index matching the offline video; receiving the specified video index returned by the video server; and determining, in all locally buffered pre-roll advertisements according to the specified video index, the specified pre-roll advertisement corresponding to the offline video.

Optionally, the determining, among multiple pre-roll advertisements obtained by the terminal, a specified pre-roll advertisement corresponding to the offline video includes: when the terminal is in a network-unconnected state, obtaining the specified video index returned by the video server, where the specified video index is selected by the video server from the at least one pre-roll advertisement index; and determining a pre-roll advertisement corresponding to the specified video index as the specified pre-roll advertisement corresponding to the offline video.

Optionally, the playing the specified pre-roll advertisement in a process of playing the offline video includes: obtaining a pre-roll advertisement play rule; and playing the specified pre-roll advertisement according to the pre-roll advertisement play rule in the process of playing the offline video.

Optionally, the obtaining a pre-roll advertisement play rule of the specified pre-roll advertisement includes: when the terminal is in a network-unconnected state, obtaining a locally buffered pre-roll advertisement play rule; and when the terminal is in the third connection state, sending a play rule obtaining request to the video server, so that after receiving the play rule obtaining request, the video server delivers the play rule of the specified pre-roll advertisement to the terminal.

Optionally, after the playing the specified pre-roll advertisement, the method further includes: when the network connection status changes from the first connection state to the second connection state, updating a pre-roll advertisement index corresponding to the offline video; when detecting a new pre-roll advertisement index, downloading a pre-roll advertisement corresponding to the new pre-roll advertisement index; when the terminal is in the first connection state, after detecting the play operation of the offline video, updating the specified pre-roll advertisement corresponding to the offline video; and playing the updated specified pre-roll advertisement in the process of playing the offline video.

Optionally, the method further includes: when the network connection status is network-unconnected, after playing the specified pre-roll advertisement, storing advertisement viewing data corresponding to the specified pre-roll advertisement, where the advertisement viewing data includes at least a local play time of the pre-roll advertisement; and when the network connection status changes from network-unconnected to network-connected, reporting the advertisement viewing data to the video server and a third party server.

Optionally, the first connection state refers to a non-WiFi connection state.

According to the terminal provided in this embodiment of the present invention, after the play operation of the offline video is detected, the current network connection status is determined. When the terminal is in the first connection state, the specified pre-roll advertisement corresponding to the offline video is determined among multiple pre-roll advertisements obtained by the terminal. The specified pre-roll advertisement is played in the process of playing the offline video. When playing the offline video in the non-WiFi connection state, the terminal may additionally play a pre-roll advertisement, thereby expanding an audience range of the pre-roll advertisement, and relatively widening an application range. Therefore, brand or product information that a pre-roll advertisement intends to promote are widely spread relatively effectively.

In an example of the embodiments, a non-temporary computer readable storage medium including instructions is further provided, for example, a memory including instructions. The instructions may be executed by a processor of the terminal, to complete the pre-roll advertisement playing method executed by the terminal in FIG. 3a and FIG. 3b that are described above. For example, the non-temporary computer readable storage medium may be a ROM, a random access memory (RAM), a CD-ROM, a tape, a floppy disk, an optical data storage device, and the like.

Figure 7:
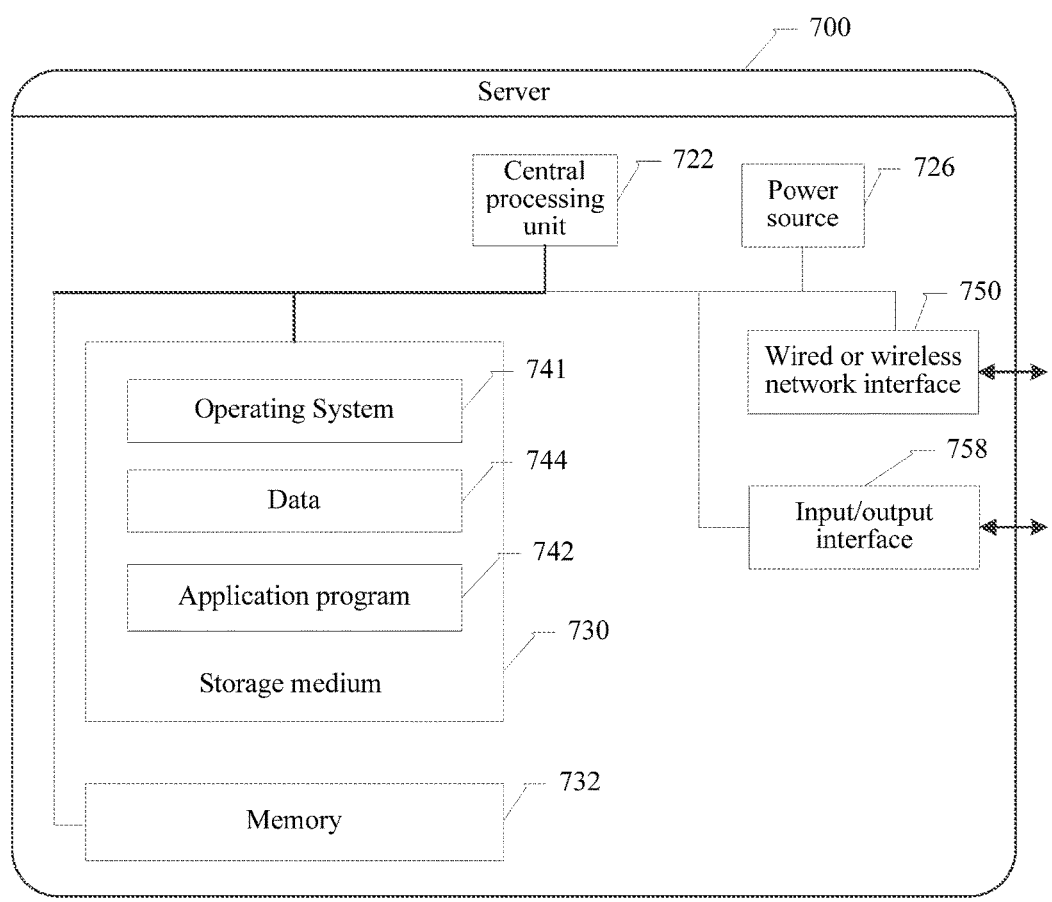
FIG. 7 is a schematic structural diagram of a video server according to an embodiment of the present invention.

FIG. 7 shows a video server according to an embodiment of the present invention. The video server may be configured to execute the pre-roll advertisement playing method executed by the video server in the foregoing embodiment. Referring to FIG. 7, the server 700 may have a great difference due to different configuration or performance, and may include one or more central processing units (CPU) 722 (for example, one or more processors), a memory 732, and one or more storage media 730 (for example, one or more mass storage device) storing an application program 742 or data 744. The memory 732 and the storage media 730 may be transient storage or persistent storage. A program stored in the storage media 730 may include one or more modules (not shown in the figure), and each module may include a series of operation instructions on the video server. Furthermore, the central processing unit 722 may be configured to communicate with the storage media 730, and perform, in the server 700, a series of instruction operations in the storage media 730.

The video server 700 may further include one or more power sources 726, one or more wired or wireless network interfaces 750, one or more input/output interfaces 756, and/or one or more operating systems 741, for example, Windows Server™, Mac OS X™, Unix™, Linux™, and FreeBSD™. One or more processors may be configured to execute the operations executed by the video server in the foregoing method embodiment.

In an example of the embodiments, a non-temporary computer readable storage medium including instructions is further provided, for example, a memory including instructions. The instructions may be executed by a processor of the video server, to complete the pre-roll advertisement playing method executed by the video server in FIG. 3a and FIG. 3b that are described above. For example, the non-temporary computer readable storage medium may be a ROM, a random access memory (RAM), a CD-ROM, a tape, a floppy disk, an optical data storage device, and the like.

A person of ordinary skill in the art may understand that all or some of the steps of the embodiments may be implemented by hardware, or may be implemented by a program by instructing related hardware. The program may be stored in a computer readable storage medium. The storage medium may be: a read-only memory, a magnetic disk, or an optical disc.

The foregoing descriptions are merely examples of embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A method for playing pre-roll advertisements, applied to a terminal and comprising:

detecting a play operation of an offline video;

in a first connection state, when detecting a video download operation, sending a pre-roll advertisement obtaining request to a video server;

receiving at least one pre-roll advertisement index from the video server according to the pre-roll advertisement obtaining request;

obtaining at least one pre-roll advertisement corresponding to the at least one pre-roll advertisement index, and storing the at least one pre-roll advertisement; and updating a list of locally stored pre-roll advertisements according to the at least one pre-roll advertisement index;

determining a current network connection status of the terminal;

when the terminal is in a second connection state, determining, among multiple pre-roll advertisements obtained by the terminal, a specified pre-roll advertisement corresponding to the offline video, comprising:

when the terminal is in a network-unconnected state, obtaining a specified video index returned by the video server, wherein the specified video index is selected by the video server from the at least one pre-roll advertisement index; and determining a pre-roll advertisement corresponding to the specified video index as the specified pre-roll advertisement corresponding to the offline video; and playing the specified pre-roll advertisement in a process of playing the offline video.

2. The method according to claim 1, wherein the determining, among multiple pre-roll advertisements obtained by the terminal, a specified pre-roll advertisement corresponding to the offline video comprises:

when the terminal is in a third connection state, sending a pre-roll advertisement menu request to a video server, wherein the pre-roll advertisement menu request comprises all locally stored pre-roll advertisement indexes, so that the video server selects, from all the pre-roll advertisement indexes, a specified video index matching the offline video;

receiving the specified video index returned by the video server; and determining, in all locally stored pre-roll advertisements according to the specified video index, the specified pre-roll advertisement corresponding to the offline video.

3. The method according to claim 1, wherein after the playing the specified pre-roll advertisement, the method further comprises:

when the network connection status changes from the second connection state to the first connection state, updating a pre-roll advertisement index corresponding to the offline video;

when detecting a new pre-roll advertisement index, downloading a pre-roll advertisement corresponding to the new pre-roll advertisement index;

when the terminal is in the second connection state, after detecting the play operation of the offline video, updating the specified pre-roll advertisement corresponding to the offline video; and playing the updated specified pre-roll advertisement in the process of playing the offline video.

4. The method according to claim 1, wherein the method further comprises:

when the network connection status is network-unconnected, after playing the specified pre-roll advertisement, storing advertisement viewing data corresponding to the specified pre-roll advertisement, wherein the advertisement viewing data comprises at least a local play time of the pre-roll advertisement; and when the network connection status changes from network-unconnected to network-connected, reporting the advertisement viewing data to a video server and a third party server; or when the network connection status is a third connection state, after playing the specified pre-roll advertisement, reporting advertisement viewing data to a video server.

5. The method according to claim 1, wherein the terminal includes a buffered pre-roll advertisement database and an offline pre-roll advertisement database, and the method further comprises:

in the first connection state, buffering the pre-roll advertisement in the buffered pre-roll advertisement database when an online video is watched; and in the second connection state, storing the pre-roll advertisement obtained from the video server in the offline pre-roll advertisement database.

6. A method for playing pre-roll advertisements, applied to a video server and comprising:

obtaining a list of pre-roll advertisements that can be played when a terminal is in a first connection state, comprising:

receiving a pre-roll advertisement obtaining request sent by the terminal, wherein the pre-roll advertisement obtaining request is sent after the terminal detects a download operation of the offline video, and the pre-roll advertisement obtaining request comprises at least identification information of the offline video; and obtaining, according to the identification information of the offline video, the list of pre-roll advertisements that can be played when the terminal is in the first connection state;

screening pre-roll advertisements in the list of pre-roll advertisements, to obtain a specified video index; and returning the specified video index to the terminal, wherein the terminal determines, according to the specified video index and among multiple pre-roll advertisements obtained by the terminal, a specified pre-roll advertisement corresponding to a to-be-played offline video, and plays a specified pre-roll advertisement corresponding to the specified video index in the first connection state.

7. The method according to claim 6, wherein the obtaining a list of pre-roll advertisements that can be played when a terminal is in a first connection state further comprises:

when the terminal plays an offline video in a third connection state, receiving a pre-roll advertisement menu request sent by the terminal, wherein the pre-roll advertisement menu request comprises at least all pre-roll advertisement indexes locally stored by the terminal; and determining all the pre-roll advertisement indexes as the list of pre-roll advertisements that can be played when the terminal is in the first connection state.

8. The method according to claim 6, wherein the screening pre-roll advertisements in the list of pre-roll advertisements, to obtain a specified video index comprises:

filtering the pre-roll advertisements in the list of pre-roll advertisements, to obtain a first list of pre-roll advertisements;

screening pre-roll advertisements in the first list of pre-roll advertisements according to a video targeting condition, to obtain a second list of pre-roll advertisements; and selecting, from the second list of pre-roll advertisements, a pre-roll advertisement satisfying a menu condition, to obtain the specified video index.

9. The method according to claim 6, wherein the terminal includes a buffered pre-roll advertisement database and an offline pre-roll advertisement database, and the method further comprises:

in the first connection state, buffering the pre-roll advertisement in the buffered pre-roll advertisement database when an online video is watched; and in the second connection state, storing the pre-roll advertisement obtained from the video server in the offline pre-roll advertisement database.

10. A terminal, comprising a processor and a memory, the memory storing computer program instructions, and the processor executing the program instructions stored in the memory to perform the following operations:

detecting a play operation of an offline video;

in a first connection state, when detecting a video download operation, sending a pre-roll advertisement obtaining request to a video server;

receiving at least one pre-roll advertisement index from the video server according to the pre-roll advertisement obtaining request;

obtaining at least one pre-roll advertisement corresponding to the at least one pre-roll advertisement index, and storing the at least one pre-roll advertisement; and updating a list of locally stored pre-roll advertisements according to the at least one pre-roll advertisement index;

determining a current network connection status of the terminal;

when the terminal is in a second connection state, determining, among multiple pre-roll advertisements obtained by the terminal, a specified pre-roll advertisement corresponding to the offline video, comprising:

when the terminal is in a network-unconnected state, obtaining a specified video index returned by the video server, wherein the specified video index is selected by the video server from the at least one pre-roll advertisement index; and determining a pre-roll advertisement corresponding to the specified video index as the specified pre-roll advertisement corresponding to the offline video; and playing the specified pre-roll advertisement in a process of playing the offline video.

11. The terminal according to claim 10, wherein the processor executes the program instructions stored in the memory, to perform the following operations:

when the terminal is in a third connection state, sending a pre-roll advertisement menu request to a video server, wherein the pre-roll advertisement menu request comprises at least all locally stored pre-roll advertisement indexes, so that the video server selects, from all the pre-roll advertisement indexes, a specified video index matching the offline video; receiving the specified video index returned by the video server; and determining, in all locally stored pre-roll advertisements according to the specified video index, the specified pre-roll advertisement corresponding to the offline video.

12. The terminal according to claim 10, wherein the processor executes the program code stored in the memory, to perform the following operations:
- when the network connection status changes from the second connection state to the first connection state, updating a pre-roll advertisement index corresponding to the offline video;
- when detecting a new pre-roll advertisement index, downloading a pre-roll advertisement corresponding to the new pre-roll advertisement index;
- when the terminal is in the second connection state, after detecting the play operation of the offline video, updating the specified pre-roll advertisement corresponding to the offline video; and
- playing the updated specified pre-roll advertisement in the process of playing the offline video.

13. The terminal according to claim 10, wherein the processor executes the program code stored in the memory, to perform the following operations:
- when the network connection status is network-unconnected, after playing the specified pre-roll advertisement, storing advertisement viewing data corresponding to the specified pre-roll advertisement, wherein the advertisement viewing data comprises at least a local play time of the pre-roll advertisement; and when the network connection status changes from network-unconnected to network-connected, reporting the advertisement viewing data to a video server and a third party server; or when the network connection status is a third connection state, after playing the specified pre-roll advertisement, reporting advertisement viewing data to a video server.

14. The terminal according to claim 10, further comprising a buffered pre-roll advertisement database and an offline pre-roll advertisement database, wherein the operations further comprise:
- in the first connection state, buffering the pre-roll advertisement in the buffered pre-roll advertisement database when an online video is watched; and
- in the second connection state, storing the pre-roll advertisement obtained from the video server in the offline pre-roll advertisement database.

\* \* \* \* \*